US011748545B2

(12) United States Patent
Huang et al.

(10) Patent No.: US 11,748,545 B2
(45) Date of Patent: Sep. 5, 2023

(54) METHOD AND ELECTRONIC DEVICE FOR CONFIGURING SIGNAL PADS BETWEEN THREE-DIMENSIONAL STACKED CHIPS

(71) Applicant: I-SHOU UNIVERSITY, Kaohsiung (TW)

(72) Inventors: Yu-Jung Huang, Kaohsiung (TW); Mong-Na Lo Huang, Kaohsiung (TW); Tzu-Lun Yuan, Taichung (TW); Mei-Hui Guo, Kaohsiung (TW)

(73) Assignee: I-SHOU UNIVERSITY, Kaohsiung (TW)

( * ) Notice: Subject to any disclaimer, the term of this patent is extended or adjusted under 35 U.S.C. 154(b) by 210 days.

(21) Appl. No.: 17/458,598

(22) Filed: Aug. 27, 2021

(65) Prior Publication Data
US 2023/0038144 A1    Feb. 9, 2023

(30) Foreign Application Priority Data

Aug. 4, 2021 (TW) ................................. 110128699

(51) Int. Cl.
*G06F 30/00* (2020.01)
*G06F 30/392* (2020.01)
(Continued)

(52) U.S. Cl.
CPC ......... *G06F 30/392* (2020.01); *H04B 17/391* (2015.01); *H01L 25/0657* (2013.01); *H01L 2225/06531* (2013.01)

(58) Field of Classification Search
CPC ... G06F 30/392; G06F 30/367; H04B 17/391; H01L 25/0657; H01L 2225/06531
See application file for complete search history.

(56) References Cited

U.S. PATENT DOCUMENTS 7,723,999 B2 * 5/2010 Strid ................... G01R 35/007
                                                324/750.02
8,560,296 B2 * 10/2013 Norte .................. H05K 3/0005
                                                703/14
(Continued)

FOREIGN PATENT DOCUMENTS

CA    3043829 A1 * 11/2019 ............. G01D 18/00
CN    101000880        8/2010
(Continued)

OTHER PUBLICATIONS

Tzu-Lun Yuan et al., "Placement Design for a Stacked Die Package With Reliable Wireless Connections", IEEE Transactions On Reliability, vol. 69, No. 4, Dec. 2020, pp. 1230-1238.
(Continued)

Primary Examiner — Naum Levin
(74) Attorney, Agent, or Firm — JCIPRNET

(57) ABSTRACT

A method and an electronic device for configuring signal pads between three-dimensional stacked chips are provided. The method includes: obtaining a plurality of frequency response curves corresponding to a plurality of parameter sets; obtaining an operating frequency; selecting a selected frequency response curve from the plurality of frequency response curves according to the operating frequency, where the selected frequency response curve corresponds to a selected parameter set among the plurality of parameter sets; generating, according to the selected parameter set, a signal pad configuration for configuring a first signal pad and a second signal pad on a surface of a chip; and outputting the signal pad configuration.

10 Claims, 4 Drawing Sheets

(51) Int. Cl.
  *H04B 17/391* (2015.01)
  *H01L 25/065* (2023.01)

(56) References Cited

U.S. PATENT DOCUMENTS

| | | | |
|---|---|---|---|
| 8,680,681 | B2 | 3/2014 | Ryan |
| 9,432,298 | B1 * | 8/2016 | Smith ................. H04L 49/9057 |
| 9,853,679 | B2 * | 12/2017 | Nguyen ............... H03H 9/2436 |
| 10,422,831 | B2 * | 9/2019 | Huang ............... G01R 31/2884 |
| 11,290,084 | B2 * | 3/2022 | Nielsen ................. H03H 9/545 |
| 2022/0237337 | A1 * | 7/2022 | Halim ..................... H03F 3/193 |

FOREIGN PATENT DOCUMENTS

| | | | | |
|---|---|---|---|---|
| CN | 101587875 | | 7/2012 | |
| CN | 104134651 | B * | 6/2018 | ........... H01L 21/563 |
| CN | 114125089 | A * | 3/2022 | |
| TW | 373279 | | 11/1999 | |
| TW | 549593 | | 8/2003 | |
| TW | 201117341 | | 5/2011 | |
| TW | I420648 | | 12/2013 | |
| TW | I538156 | | 6/2016 | |
| WO | WO-0016089 | A2 * | 3/2000 | |
| WO | WO-2009071782 | A2 * | 6/2009 | ........... G06F 30/367 |

OTHER PUBLICATIONS

Yu-Jung Huang et al., "Differential Pad Placement Design of a Capacitive Coupling-Based Stacked Die Package", IEEE Transactions On Components, Packaging and Manufacturing Technology, vol. 7, No. 7, Jul. 2017, pp. 1035-1042.

"Office Action of Taiwan Counterpart Application", dated Mar. 21, 2022, p. 1-p. 4.

\* cited by examiner

METHOD AND ELECTRONIC DEVICE FOR CONFIGURING SIGNAL PADS BETWEEN THREE-DIMENSIONAL STACKED CHIPS

CROSS-REFERENCE TO RELATED APPLICATION

This application claims the priority benefit of Taiwan application serial no. 110128699, filed on Aug. 4, 2021. The entirety of the above-mentioned patent application is hereby incorporated by reference herein and made a part of this specification.

BACKGROUND

Technical Field

The disclosure relates to a method and an electronic device for configuring signal pads between three-dimensional stacked chips.

Description of Related Art

Along with miniaturization and cost reduction of electronic products, miniaturization of IC chips and three-dimensional stacking and packaging have become an important direction in the development of semiconductor technology in the future. Therefore, the three-dimensional stacking technology of chips has attracted much attention. The three-dimensional stacked chips are provided by means of vertically stacking a plurality of chips in a three-dimensional space, and the package size of the chips is significantly reduced in this way.

The chips in the three-dimensional stacked chips may communicate with each other without relying on physical wires through the AC coupled interconnect (ACCI) technology. The ACCI is mainly carried out through AC coupling interconnection. The ACCI does not require a connection of a DC electrical component in the case of high-frequency transmission, and only a good AC connection is required to complete the signal transmission. Moreover, in a capacitive coupling chip, the circuit design of the transmitting end is relatively simple as long as sufficient driving power is provided. Further, the coupling capacitor area required by the capacitive coupling chip is small, so that the capacitive coupling chip is quite suitable for being applied in integration of chips.

In signal transmission of the three-dimensional stacked chip system, the transmitting end and the receiving end may be implemented by signal pads. When a signal is transmitted from the transmitting end to the receiving end, if the signal pad acting as the transmitting end is not aligned with the signal pad acting as the receiving end, interference may become more serious. In addition, if the signal pad configurations are different, the interference received by the transmission channel between the signal pads may also be different. Accordingly, how to effectively reduce the mutual interference of different signals in the three-dimensional stacked chips is an important issue.

SUMMARY

The disclosure is directed to a method and an electronic device for configuring signal pads between three-dimensional stacked chips, which are adapted to optimize signal transmission between the three-dimensional stacked chips.

The disclosure provides an electronic device for configuring signal pads between three-dimensional stacked chips, and the electronic device includes a processor and a storage medium.

The storage medium stores a plurality of frequency response curves corresponding to a plurality of parameter sets. The processor is coupled to the storage medium, and the processor is configured to obtain an operating frequency and select a selected frequency response curve from the plurality of frequency response curves according to the operating frequency. The selected frequency response curve corresponds to a selected parameter set among the plurality of parameter sets. The processor is further configured to generate a signal pad configuration for configuring a first signal pad and a second signal pad on a surface of a chip according to the selected parameter set and output the signal pad configuration.

In an embodiment of the disclosure, the selected parameter set includes a pad size. In the signal pad configuration, an area of a first surface of the first signal pad is configured according to the pad size, where the first surface is parallel to the surface.

In an embodiment of the disclosure, the selected parameter set includes a pad-pair pitch. In the signal pad configuration, the second signal pad is configured to be adjacent to the first signal pad in a first direction, where the first signal pad and the second signal pad are spaced apart by the pad-pair pitch in the first direction.

In an embodiment of the disclosure, the selected parameter set further includes an overlap area. In the signal pad configuration, the first signal pad and the second signal pad are arranged to have a shift distance in a second direction, where a first projection of the first signal pad in the second direction is overlapped with a second projection of the second signal pad in the second direction to form the overlap area. The second direction is perpendicular to the first direction.

In an embodiment of the disclosure, the processor generates the plurality of frequency response curves according to a pad size, a pad-pair pitch, and an overlap area.

In an embodiment of the disclosure, the processor calculates the plurality of frequency response curves according to an exponential decay model, where the exponential decay model includes:

$$\begin{cases} y(f \mid u, v) = g_1(f \mid u, v) + \epsilon_1 \\ g_1(f \mid u, v) = \alpha_1(u, v) e^{-h_1(f \mid u, v)}, \\ h_1(f \mid u, v) = \gamma_1(u, v) \cdot f \end{cases}$$

where, y is a frequency response, f is a frequency, u is the pad-pair pitch, v is the overlap area, $\epsilon_1$ is an error term, $\alpha_1$ and $\gamma_1$ are a plurality of parameters of a factor level pair corresponding to the pad-pair pitch and the overlap area. The parameters are associated with the pad size.

In an embodiment of the disclosure, the processor calculates the plurality of frequency response curves according to a generalized exponential decay model, where the generalized exponential decay model includes:

$$\begin{cases} y(f \mid u, v) = g_2(f \mid u, v) + \epsilon_2 \\ g_2(f \mid u, v) = \alpha_2(u, v) e^{-h_2(f \mid u, v)} \\ h_2(f \mid u, v) = \beta_1(u, v) \cdot \sqrt{f} + \beta_2(u, v) \cdot f \end{cases},$$

where, y is a frequency response, f is a frequency, u is the pad-pair pitch, v is the overlap area, $\epsilon_2$ is an error term, $\alpha_2$, $\beta_1$, and $\beta_2$ are a plurality of parameters of a factor level pair corresponding to the pad-pair pitch and the overlap area. The parameters are associated with the pad size.

In an embodiment of the disclosure, the processor generates the signal pad configuration for configuring a third signal pad and a fourth signal pad on a second surface of a second chip according to the selected parameter set. The first signal pad transmits a first signal to the third signal pad, and the second signal pad transmits a second signal to the fourth signal pad.

In an embodiment of the disclosure, the first signal and the second signal are a differential signal pair.

The disclosure provides a method for configuring signal pads between three-dimensional stacked chips. The method includes the following steps. A plurality of frequency response curves corresponding to a plurality of parameter sets are obtained. An operating frequency is obtained. A selected frequency response curve is selected from the plurality of frequency response curves according to the operating frequency, where the selected frequency response curve corresponds to a selected parameter set among the plurality of parameter sets. A signal pad configuration for configuring a first signal pad and a second signal pad on a surface of a chip is generated according to the selected parameter set. The signal pad configuration is outputted.

Based on the above description, in the disclosure, the signal pad configuration for configuring the signal pads between the three-dimensional stacked chips is generated. A designer of the three-dimensional stacked chip may arrange a placement of the signal pads by referring to the signal pad configuration, and the best transmission performance may be achieved in this way.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
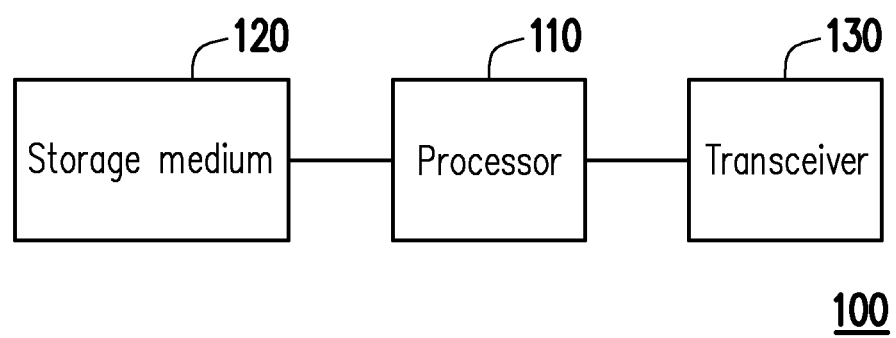
FIG. 1 is a schematic view illustrating an electronic device for configuring signal pads between three-dimensional stacked chips according to an embodiment of the disclosure.

Reference will now be made in detail to the present preferred embodiments of the disclosure, examples of which are illustrated in the accompanying drawings. Wherever possible, the same reference numbers are used in the drawings and the description to refer to the same or like parts.

FIG. 1 is a schematic view illustrating an electronic device 100 for configuring signal pads between three-dimensional stacked chips according to an embodiment of the disclosure, where the signal pads are, for example, input/output (I/O) pads or metal pads. It should be noted that, in addition to configuring the signal pads between the three-dimensional stacked chips, the electronic device 100 may also be used to configure signal pads between three-dimensional stacked dies or three-dimensional stacked wafers. The electronic device 100 may include a processor 110, a storage medium 120, and a transceiver 130.

The processor 110 is, for example, a central processing unit (CPU), or other programmable general-purpose or special-purpose micro control unit (MCU), a microprocessor, a digital signal processor (DSP), a programmable controller, an application specific integrated circuit (ASIC), a graphics processing unit (GPU), an image signal processor (ISP), an image processing unit (IPU), an arithmetic logic unit (ALU), a complex programmable logic device (CPLD), a field programmable logic gate array (FPGA) or other similar devices or a combination of the above devices. The processor 110 may be coupled to the storage medium 120 and the transceiver 130, and access and execute a plurality of modules and various application stored in the storage medium 120.

The storage medium 120 is, for example, any type of fixed or removable random access memory (RAM), read-only memory (ROM), flash memory, hard disk drive (HDD), solid state drive (SSD) or similar devices or a combination of the above devices, and is used to store a plurality of modules or various applications that may be executed by the processor 110.

The transceiver 130 transmits and receives signals in a wireless or wired manner. The transceiver 130 may also perform operations such as low noise amplification, impedance matching, frequency mixing, up or down frequency conversion, filtering, amplification, etc.

Figure 2:
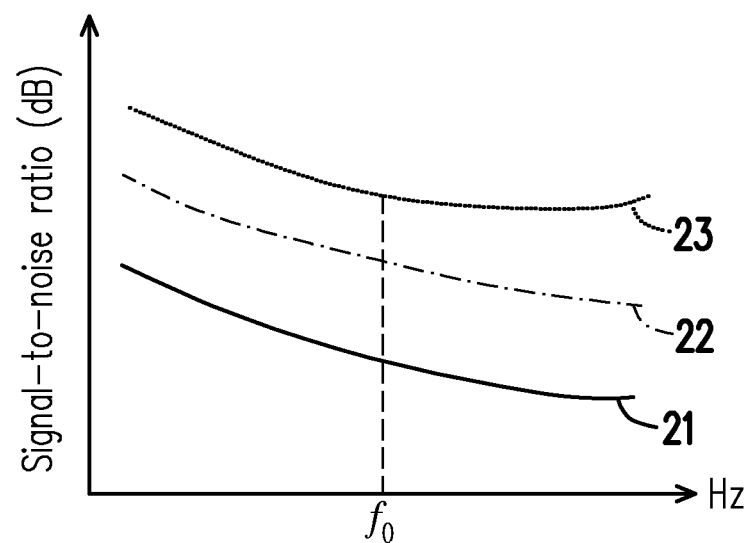
FIG. 2 is a schematic graph illustrating a plurality of frequency response curves according to an embodiment of the disclosure.

The storage medium 120 may store a plurality of frequency response curves respectively corresponding to a plurality of parameter sets. FIG. 2 is a schematic graph illustrating a plurality of frequency response curves according to an embodiment of the disclosure. The frequency response curves may include a frequency response curve 21, a frequency response curve 22, and a frequency response curve 23. The frequency response curve 21, the frequency response curve 22, and the frequency response curve 23 may respectively correspond to different parameter sets. It should be noted that the disclosure does not limit a number of the frequency response curves stored in the storage medium 120. For example, the storage medium 120 may store N frequency response curves corresponding to N parameter sets, where N may be any positive integer greater than one.

Each of the plurality of parameter sets may include, but is not limited to, parameters such as a pad size, a pad-pair pitch, or an overlap area, etc. The processor 110 may generate the above-mentioned frequency response curves according to the parameters of the pad size, the pad-pair pitch, or the overlap area. In an embodiment, the processor 110 may calculate the frequency response curves according to an exponential decay (ED) model shown in a following equation (1), where y is a frequency response, f is a frequency, u is the pad-pair pitch, v is the overlap area, $\epsilon_1$ is an error term, $\alpha_1$ and $\gamma_1$ are parameters of a factor level pair (u, v) corresponding to the pad-pair pitch and the overlap area. The parameters $\alpha_1$ and $\gamma_1$ may be defined by a user. In an embodiment, the parameters $\alpha_1$ and $\gamma_1$ may be associated with the pad size. For example, the parameters $\alpha_1$ and $\gamma_1$ may be proportional to the pad size. In other words, the pad size may be a function of the parameters $\alpha_1$ and $\gamma_1$.

$$\begin{cases} y(f \mid u, v) = g_1(f \mid u, v) + \epsilon_1 \\ g_1(f \mid u, v) = \alpha_1(u, v) e^{-h_1(f \mid u, v)} \\ h_1(f \mid u, v) = \gamma_1(u, v) \cdot f \end{cases} \quad (1)$$

In an embodiment, the processor 110 may calculate the frequency response curves according to a generalized exponential decay (GED) model shown in a following equation (2), where y is a frequency response, f is a frequency, u is the pad-pair pitch, v is the overlap area, $\epsilon_2$ is an error term, $\alpha_2$, $\beta_1$, and $\beta_2$, are parameters of a factor level pair (u, v) corresponding to the pad-pair pitch and the overlap area. The parameters $\alpha_2$, $\beta_1$, and $\beta_2$, may be defined by the user. In an embodiment, the parameters $\alpha_2$, $\beta_1$, and $\beta_2$, may be associated with the pad size. For example, the parameters $\alpha_2$, $\beta_1$, and $\beta_2$, may be proportional to the pad size. In other words, the pad size may be a function of the parameters $\alpha_2$, $\beta_1$, and $\beta_2$.

$$\begin{cases} y(f \mid u, v) = g_2(f \mid u, v) + \epsilon_2 \\ g_2(f \mid u, v) = \alpha_2(u, v) e^{-h_2(f \mid u, v)} \\ h_2(f \mid u, v) = \beta_1(u, v) \cdot \sqrt{f} + \beta_2(u, v) \cdot f \end{cases} \quad (2)$$

After the plurality of frequency response curves are generated according to the equation (1) and the equation (2), the processor 110 may store a look-up table including a mapping relationship of the frequency response curves and the parameter sets in the storage medium 120. Table 1 is an example of a lookup table established based on the equation (1), where $f_1$ is a function representing the pad size.

TABLE 1

| Pad-pair pitch | Overlap area | Pad size | Frequency response curve |
|---|---|---|---|
| $u_{21}$ | $v_{21}$ | $f_1(\alpha_{1,21}, \gamma_{1,21})$ | 21 |
| $u_{22}$ | $v_{22}$ | $f_1(\alpha_{1,22}, \gamma_{1,22})$ | 22 |
| $u_{23}$ | $v_{23}$ | $f_1(\alpha_{1,23}, \gamma_{1,23})$ | 23 |

The processor 110 may obtain an operating frequency of the three-dimensional stacked chips through the transceiver 130. For example, if a designer of the three-dimensional stacked chips wants to design three-dimensional stacked chips with an operating frequency of $f_0$ Hz, the designer may input related information of the operating frequency $f_0$ through an input device (such as a keyboard). The processor 110 may be communicated with and connected to the input device through the transceiver 130, and receive the related information of the operating frequency $f_0$ from the input device.

The processor 110 may select a selected frequency response curve from the plurality of frequency response curves according to the operating frequency $f_0$. To be specific, the processor 110 may determine which one of the plurality of frequency response curves has the best performance when the operating frequency is $f_0$. Taking FIG. 2 as an example, since the frequency response curve 23 has the highest signal-to-noise ratio at the operating frequency $f_0$, the processor 110 may select the frequency response curve 23 from the three frequency response curves of FIG. 2 to act as the selected frequency response curve. The processor 110 may further obtain a selected parameter set corresponding to the selected frequency response curve. Taking table 3 as an example, the processor 110 may obtain a selected parameter set corresponding to the frequency response curve 23 in response to that the frequency response curve 23 is the selected frequency response curve, where the selected parameter set may include a pad-pair pitch $u_{23}$, an overlap area $v_{23}$ and a pad size $f_1$ ($\alpha_{1,23}, \gamma_{1,23}$), etc.

After obtaining the selected parameter set, the processor 110 may generate a signal pad configuration according to the selected parameter set, where the signal pad configuration may be used to configure at least two signal pads on a surface of one or a plurality of chips. The processor 110 may output the signal pad configuration through the transceiver 130 for the reference of the designer of the three-dimensional stacked chips. In an embodiment, the processor 110 may execute the content recorded in the signal pad configuration to generate a layout of the three-dimensional stacked chips, and output the layout through the transceiver 130 for the designer's reference.

Figure 3:
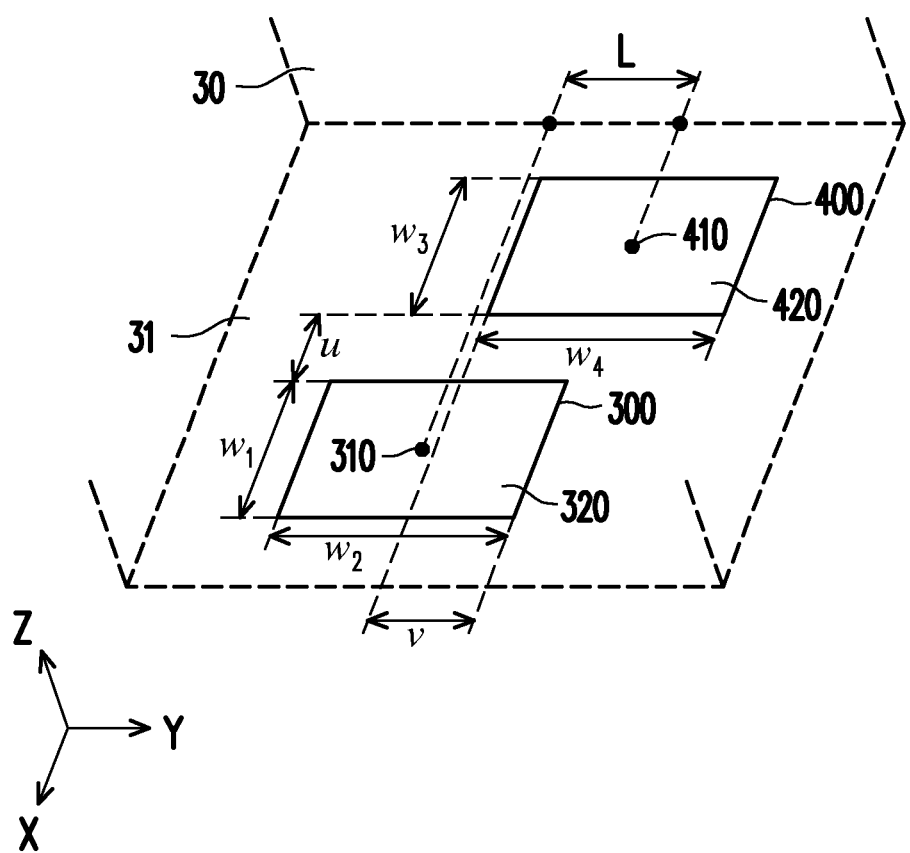
FIG. 3 is a schematic diagram illustrating a signal pad configuration according to an embodiment of the disclosure.

FIG. 3 is a schematic diagram illustrating a signal pad configuration according to an embodiment of the disclosure. The selected parameter set corresponding to the signal pad configuration may be used to set a signal pad 300 and a signal pad 400 on a surface 31 of a chip (or die, wafer) 30. In the embodiment, the signal pad 300 is, for example, a rectangle with a long side $w_2$ and a short side $w_1$, and the signal pad 400 is, for example, a rectangle with a long side $w_4$ and a short side $w_3$, where a length of the side $w_1$ of the signal pad 300 and a length of the side $w_3$ of the signal pad 400 may be the same or different, and a length of the side $w_2$ of the signal pad 300 and a length of the side $w_4$ of the signal pad 400 may be the same or different. It should be noted that the disclosure does not limit the shape of the signal pad.

In this embodiment, it is assumed that the surface 31 of the chip 30 is parallel to an XY plane, and a normal line of the surface 31 extends along a negative direction of a Z-axis. The short side of the signal pad 300 or the signal pad 400 may be parallel to an X-axis. The long side of the signal pad 300 or the signal pad 400 may be parallel to a Y-axis.

The selected parameter set may include a pad size. The pad size may be an area of the signal pad. The signal pad configuration may include a step of "arranging the area of the signal spacer 300 or the signal spacer 400 according to the pad size".

For example, the pad size may be an area of a surface 320 of the signal pad 300 (i.e., $w_1 \cdot w_2$), where the surface 320 is parallel to the surface 31 of the chip 30, and a normal line of the surface 320 and a normal line of the surface 31 extend in the same direction. In other words, the surface 320 of the signal pad 300 does not directly contact the surface 31 of the chip 30. The signal pad 300 contacts the surface 31 of the chip 30 through an opposite surface of the surface 320.

For another example, the pad size may be an area of a surface 420 of the signal pad 400 (i.e., $w_3 \cdot w_4$), where the surface 420 is parallel to the surface 31 of the chip 30, and a normal line of the surface 420 and the normal line of the surface 31 extend in the same direction. In other words, the surface 420 of the signal pad 400 does not directly contact the surface 31 of the chip 30. The signal pad 400 contacts the surface 31 of the chip 30 through an opposite surface of the surface 420.

The area of the surface 320 or the surface 420 is, for example, 5×5 $\mu m^2$, 10×10 $\mu m^2$, or 20×20 $\mu m^2$, and the disclosure is not limited thereto.

The selected parameter set may include the pad-pair pitch. The pad-pair pitch may be a distance between two signal pads in a specific direction. The signal pad configuration may include a step of "arranging a distance between the signal pad 300 and the signal pad 400 in a specific direction according to the pad-pair pitch". To be specific, the signal pad configuration may be used to configure the signal pad 400 adjacent to the signal pad 300 in the first direction according to the pad-pair pitch, so that the signal pad 300 and the signal pad 400 are spaced apart by the pad-pair pitch in the first direction. The first direction may be parallel to one of the X-axis or the Y-axis. Taking FIG. 3 as an example, it is assumed that the first direction is parallel to the X-axis. The signal pad configuration may be used to configure the signal pad 400 adjacent to the signal pad 300 in the first direction according to the pad-pair pitch, so that the signal pad 300 and the signal pad 400 are separated by the pad-pair pitch u.

The pad-pair pitch may be 5 µm, 10 µm, 15 µm, or 20 µm, which is not limited by the disclosure.

The selected parameter set may include the overlap area. It is assumed that the first direction is parallel to the X-axis; the second direction is parallel to the Y-axis (i.e., the second direction is perpendicular to the first direction); the signal pad 400 is arranged adjacent to the signal pad 300 in the first direction; a projection of a center point 310 (i.e., a geometric center of the surface 320) of the signal pad 300 in the second direction is a projection point 311; and a projection of a center point 410 (i.e., a geometric center of the surface 420) of the signal pad 400 in the second direction is a projection point 411. Then, a distance L between the projection point 311 and the projection point 411 may be defined as a shift distance, and a projection of the signal pad 300 in the second direction and a projection of the signal pad 400 in the second direction may form an overlap area v. The signal pad configuration may include a step of "configuring the signal pad 300 and the signal pad 400 according to the overlap area so that the signal pad 300 and the signal pad 400 have the shift distance in the second direction", where the projection of the signal pad 300 in the second direction and the projection of the signal pad 400 in the second direction may be partially or completely overlapped to form the overlap area v.

Generally, the larger the overlap area is, the smaller the shift distance is. The smaller the overlap area is, the larger the shift distance is.

Figure 4:
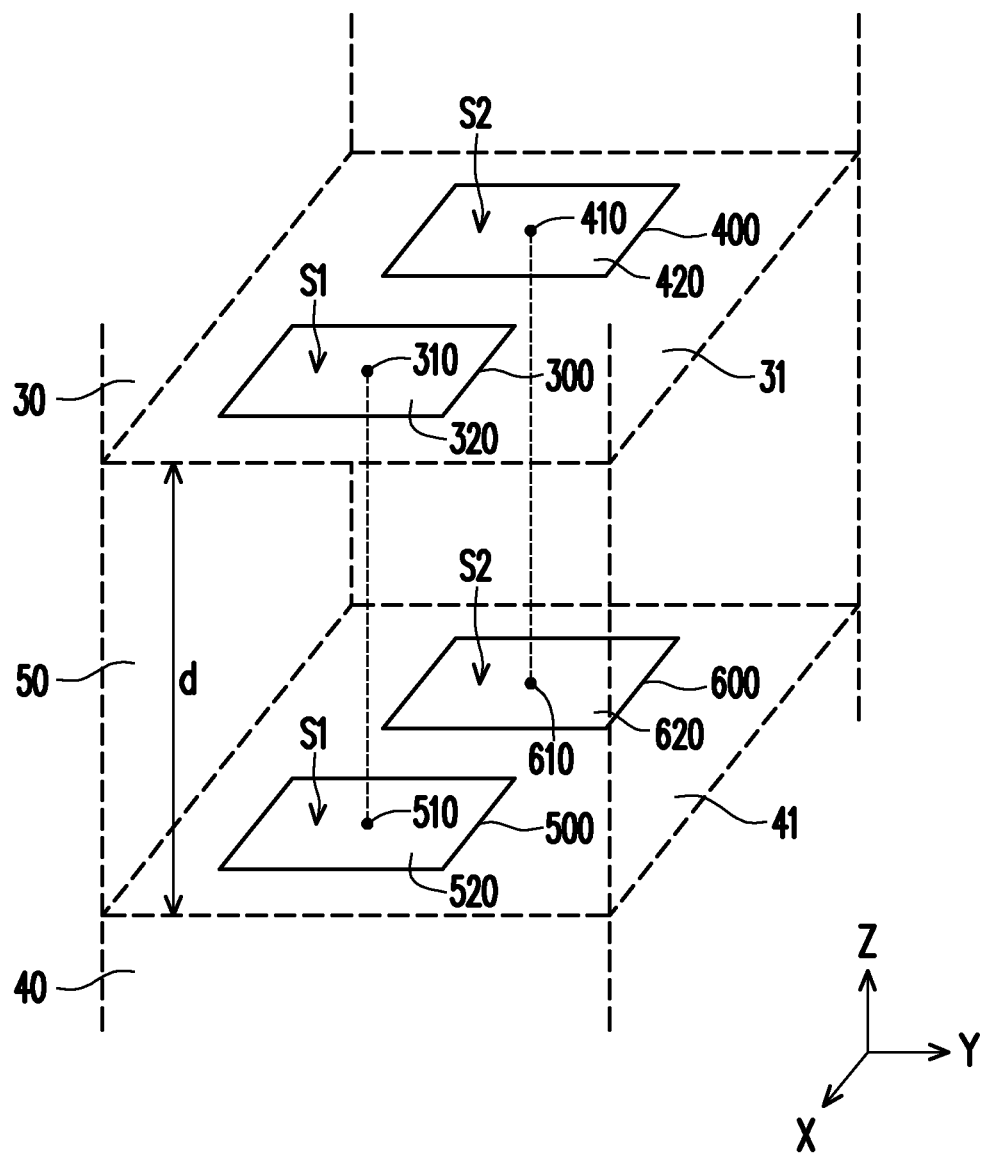
FIG. 4 is a schematic diagram illustrating another signal pad configuration according to an embodiment of the disclosure.

FIG. 4 is a schematic diagram illustrating another signal pad configuration according to an embodiment of the disclosure. In the embodiment, it is assumed that the signal pad 300 and the signal pad 400 are arranged on the surface 31 of the chip 30 in the same manner as that in FIG. 3. The selected parameter set of the signal pad configuration may be further used to configure a signal pad 500 and a signal pad 600 on a surface 41 of a chip (or die or wafer) 40. The surface 31 of the chip 30 and the surface 41 of the chip 40 may be separated by a dielectric layer 50. The surface 31 and the surface 41 may be parallel to the XY plane, where the normal line of the surface 31 may extend along the negative direction of the Z-axis, and a normal line of the surface 41 may extend along a positive direction of the Z-axis.

A distance d between the surface 31 and the surface 41 may be 4 µm, but the disclosure is not limited thereto.

The signal pad 300 may be a transmitting end of a signal S1, and the signal pad 500 may be a receiving end corresponding to the signal S1. In other words, the chip 300 may transmit the signal S1 to the chip 40 through the signal pad 300. The chip 40 may receive the signal S1 from the chip 30 through the signal pad 500. The signal pad configuration may include a step of "configuring an area of the surface 520 of the signal pad 500 according to the pad size". The area of the surface 520 may be the same as the area of the surface 320. The surface 520 of the signal pad 500 may be parallel to the surface 41 of the chip 40, and a normal line of the surface 520 may extend in the same direction as the normal line of the surface 41. In other words, the surface 520 of the signal pad 500 does not directly contact the surface 41 of the chip 40. The signal pad 500 contacts the surface 41 of the chip 40 through an opposite surface of the surface 520. A projection of a center point 510 of the signal pad 500 on the XY plane and a projection of the center point 310 of the signal pad 300 on the XY plane may be completely overlapped.

On the other hand, the signal pad 400 may be a transmitting end of a signal S2, and the signal pad 600 may be a receiving end corresponding to the signal S2. In other words, the chip 30 may transmit the signal S2 to the chip 40 through the signal pad 400. The chip 40 may receive the signal S2 from the chip 30 through the signal pad 600. The signal pad configuration may include a step of "configuring an area of the surface 620 of the signal pad 600 according to the pad size". The area of the surface 620 may be the same as the area of the surface 420. The surface 620 of the signal pad 600 may be parallel to the surface 41 of the chip 40, and a normal line of the surface 620 may extend in the same direction as the normal line of the surface 41. In other words, the surface 620 of the signal pad 600 does not directly contact the surface 41 of the chip 40. The signal pad 600 contacts the surface 41 of the chip 40 through an opposite surface of the surface 620. A projection of a center point 610 of the signal pad 600 on the XY plane and the projection of the center point 410 of the signal pad 400 on the XY plane may be completely overlapped.

The area of the surface 520 or the surface 620 is, for example, 5×5 µm$^2$, 10×10 µm$^2$, or 20×20 µm$^2$, but the disclosure is not limited thereto.

Similar to the configuration of the signal pad 300 and the signal pad 400 in FIG. 3, the signal pad configuration may include a step of "configuring a distance between the signal pad 500 and the signal pad 600 in a specific direction according to the pad-pair pitch". Taking FIG. 4 as an example, it is assumed that the first direction is parallel to the X-axis, the signal pad configuration may be used to configure the signal pad 600 adjacent to the signal pad 500 in the first direction according to the pad-pair pitch, so that the signal pad 500 and the signal pad 600 are spaced apart by the pad-pair pitch u.

Similar to the configuration of the signal pad 300 and the signal pad 400 in FIG. 3, the signal pad configuration may include a step of "configuring the signal pad 500 and the signal pad 600 according to the overlap area in the selected parameter set so that the signal pad 500 and the signal pad 600 have a shift distance in the second direction". For example, it is assumed that the second direction is perpendicular to the first direction, and the signal pad 600 is arranged adjacent to the signal pad 500 in the first direction. In this way, the signal pad configuration may be used to configure the signal pad 500 and the signal pad 600 according to the overlap area, so that the signal pad 500 and the signal pad 600 have the shift distance in the second direction. A projection of the signal pad 500 in the second direction and a projection of the signal pad 600 in the second direction may be partially or completely overlapped to form the overlap area v.

In an embodiment, the signal S1 and the signal S2 may be different signals (e.g., differential signals). In order to reduce the signal interference between the three-dimensional stacked chips, the disclosure proposes a better placement method for the signal pads. The signal pads 300, 400, 500, and 600 may be arranged according to the signal pad configuration of the disclosure, so as to reduce the interference between the signal S1 and the signal S2. For example, if the signal S1 and the signal S2 are different signals (e.g., different in amplitude, phase, or waveform), the signal pad configuration may be used to configure the signal pad 300 and the signal pad 400 (or the signal pad 500 and the signal pad 600) according to the pad-pair pitch of 10 µm.

In one embodiment, the signal S1 and the signal S2 may be a differential signal pair. Namely, the signal S1 and the signal S2 may have the same amplitude but opposite phase. If the signal S1 and the signal S2 are a differential signal pair, the signal pad configuration may be used to configure the signal pad 300 and the signal pad 400 (or the signal pad 500 and the signal pad 600) according to the pad-pair pitch of 5 µm, 10 µm, 15 µm or 20 µm.

Figure 5:
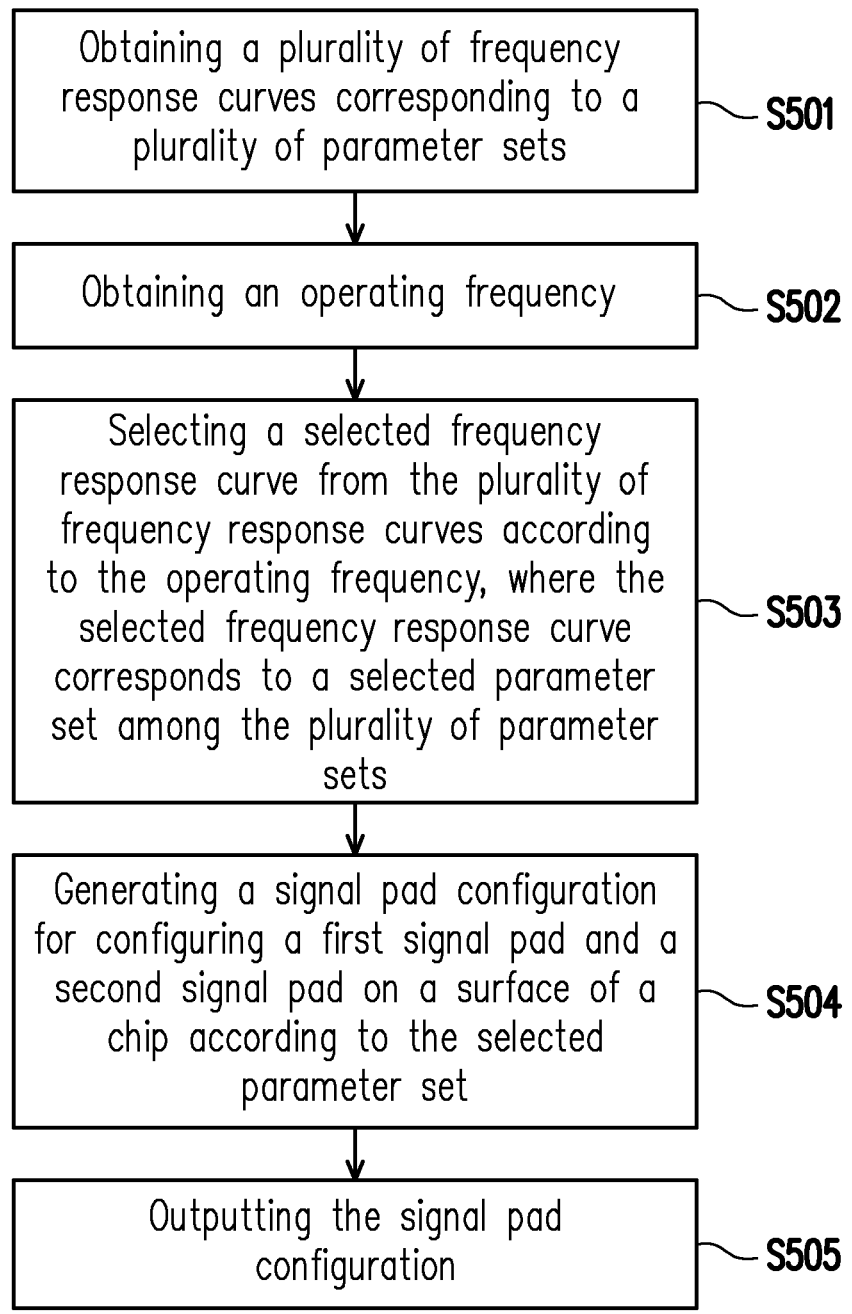
FIG. 5 is a flow chart illustrating a method for configuring signal pads between three-dimensional stacked chips according to an embodiment of the disclosure.

FIG. 5 is a flow chart illustrating a method for configuring signal pads between three-dimensional stacked chips according to an embodiment of the disclosure, where the method may be implemented by the electronic device 100 shown in FIG. 1. In step S501, a plurality of frequency response curves respectively corresponding to a plurality of parameter sets are obtained. In step S502, an operating frequency is obtained. In step S503, a selected frequency response curve is selected from the plurality of frequency response curves according to the operating frequency, where the selected frequency response curve corresponds to a selected parameter set among the plurality of parameter sets. In step S504, a signal pad configuration for configuring a first signal pad and a second signal pad on a surface of a chip is generated according to the selected parameter set. In step S505, the signal pad configuration is outputted.

In view of the foregoing, in the disclosure, a plurality of frequency response curves may be calculated according to the exponential decay model based on parameters such as pad size, pad-pair pitch, and overlap area. After the operating frequency of the three-dimensional stacked chips is determined, in the disclosure, the frequency response curve with the best performance at the operating frequency may be selected from the plurality of frequency response curves, so that the signal pad configuration may be generated according to the selected frequency response curve. The signal pad configuration may be used as a reference for generating a layout of the three-dimensional stacked chips. In the placement method of arranging the signal pads according to the signal pad configuration, the signal transmission between the three-dimensional stacked chips may be optimized.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An electronic device for configuring signal pads between three-dimensional stacked chips, comprising:
   a storage medium, storing a plurality of frequency response curves corresponding to a plurality of parameter sets; and
   a processor, coupled to the storage medium, wherein the processor is configured to:
   obtain an operating frequency;
   select a selected frequency response curve from the plurality of frequency response curves according to the operating frequency, wherein the selected frequency response curve corresponds to a selected parameter set among the plurality of parameter sets;
   generate a signal pad configuration for configuring a first signal pad and a second signal pad on a surface of a chip according to the selected parameter set; and
   output the signal pad configuration.

2. The electronic device according to claim 1, wherein the selected parameter set comprises a pad size, wherein the signal pad configuration comprises:
   configuring an area of a first surface of the first signal pad according to the pad size, wherein the first surface is parallel to the surface.

3. The electronic device according to claim 1, wherein the selected parameter set comprises a pad-pair pitch, wherein the signal pad configuration comprises:
   configuring the second signal pad adjacent to the first signal pad in a first direction, wherein the first signal pad and the second signal pad are spaced apart by the pad-pair pitch in the first direction.

4. The electronic device according to claim 3, wherein the selected parameter set further comprises an overlap area, wherein the signal pad configuration further comprises:
   configuring the first signal pad and the second signal pad to have a shift distance in a second direction, wherein a first projection of the first signal pad in the second direction is overlapped with a second projection of the second signal pad in the second direction to form the overlap area, wherein the second direction is perpendicular to the first direction.

5. The electronic device according to claim 1, wherein the processor generates the plurality of frequency response curves according to a pad size, a pad-pair pitch, and an overlap area.

6. The electronic device according to claim 5, wherein the processor calculates the plurality of frequency response curves according to an exponential decay model, wherein the exponential decay model comprises:

$$\begin{cases} y(f \mid u, v) = g_1(f \mid u, v) + \epsilon_1 \\ g_1(f \mid u, v) = \alpha_1(u, v)e^{-h_1(f \mid u, v)} \\ h_1(f \mid u, v) = \gamma_1(u, v) \cdot f \end{cases},$$

wherein, y is a frequency response, f is a frequency, u is the pad-pair pitch, v is the overlap area, $\epsilon_1$ is an error term, and $\alpha_1$ and $\gamma_1$ are a plurality of parameters of a factor level pair corresponding to the pad-pair pitch and the overlap area, wherein the parameters are associated with the pad size.

7. The electronic device according to claim 5, wherein the processor calculates the plurality of frequency response curves according to a generalized exponential decay model, wherein the generalized exponential decay model comprises:

$$\begin{cases} y(f \mid u, v) = g_2(f \mid u, v) + \epsilon_2 \\ g_2(f \mid u, v) = \alpha_2(u, v)e^{-h_2(f \mid u, v)} \\ h_2(f \mid u, v) = \beta_1(u, v) \cdot \sqrt{f} + \beta_2(u, v) \cdot f \end{cases},$$

wherein, y is a frequency response, f is a frequency, u is the pad-pair pitch, v is the overlap area, $\in_2$ is an error term, and $\alpha_2$, $\beta_1$, and $\beta_2$ are a plurality of parameters of a factor level pair corresponding to the pad-pair pitch and the overlap area, wherein the parameters are associated with the pad size.

8. The electronic device according to claim 1, wherein the processor generates the signal pad configuration for configuring a third signal pad and a fourth signal pad on a second surface of a second chip according to the selected parameter set, wherein the first signal pad transmits a first signal to the third signal pad, and the second signal pad transmits a second signal to the fourth signal pad.

9. The electronic device according to claim 8, wherein the first signal and the second signal are a differential signal pair.

10. A method for configuring signal pads between three-dimensional stacked chips, comprising:
  obtaining a plurality of frequency response curves corresponding to a plurality of parameter sets;
  obtaining an operating frequency;
  selecting a selected frequency response curve from the plurality of frequency response curves according to the operating frequency, wherein the selected frequency response curve corresponds to a selected parameter set among the plurality of parameter sets;
  generating a signal pad configuration for configuring a first signal pad and a second signal pad on a surface of a chip according to the selected parameter set; and
  outputting the signal pad configuration.

* * * * *